United States Patent [19]

Shio

[11] 4,083,256
[45] Apr. 11, 1978

[54] SINGLE-AXIS COARSE AND FINE ADJUSTMENT DEVICE PROVIDED WITH MEDIUM ADJUSTMENT

[75] Inventor: Megumu Shio, Kamakura, Japan

[73] Assignee: Nippon Kogaku K. K., Tokyo, Japan

[21] Appl. No.: 718,452

[22] Filed: Aug. 30, 1976

[30] Foreign Application Priority Data

Aug. 13, 1975 Japan ........................ 50-110492

[51] Int. Cl.² .................. F16H 35/18; G02B 21/26
[52] U.S. Cl. .................. 74/10.52; 74/10.54; 350/86
[58] Field of Search .............. 350/86, 87, 84, 46; 74/10.52, 10.54, 10.27

[56] References Cited

U.S. PATENT DOCUMENTS

| | | | |
|---|---|---|---|
| 2,877,651 | 3/1959 | Erbe et al. | 350/86 |
| 3,492,059 | 1/1970 | Shio | 350/84 |
| 3,683,704 | 8/1972 | Kuroha | 350/86 |
| 4,020,705 | 5/1977 | Hayasaka | 350/86 |

*Primary Examiner*—Jon W. Henry
*Attorney, Agent, or Firm*—Shapiro and Shapiro

[57] ABSTRACT

A single-axis coarse and fine adjustment device for driving a carriage comprises a pinion shaft rotatably supported by stationary support means and having a pinion meshing with a rack provided on the carriage, a connecting shaft rotatably supported with the pinion shaft and having a first and a second toothed portion, first decelerating gear means meshing with the first toothed portion to decelerate the rotation of the connecting shaft and transmit it to the pinion shaft, a fine adjustment shaft rotatably supported within the connecting shaft and having a toothed portion, a fine adjustment operating member for rotating the fine adjustment shaft, second decelerating gear means meshing with the second toothed portion of the connecting shaft and the toothed portion of the fine adjustment shaft to decelerate the rotation of the fine adjustment shaft and transmit it to the connecting shaft, a medium adjustment operating member rotatably supporting the second decelerating gear means and rotatably supported by the support means so as to impart rotation of equal ratio to the connecting shaft through the second gear means, and a coarse adjustment operating member rotatably supported by the support means so as to impart rotation of equal ratio to the pinion shaft through the first decelerating gear means.

6 Claims, 9 Drawing Figures

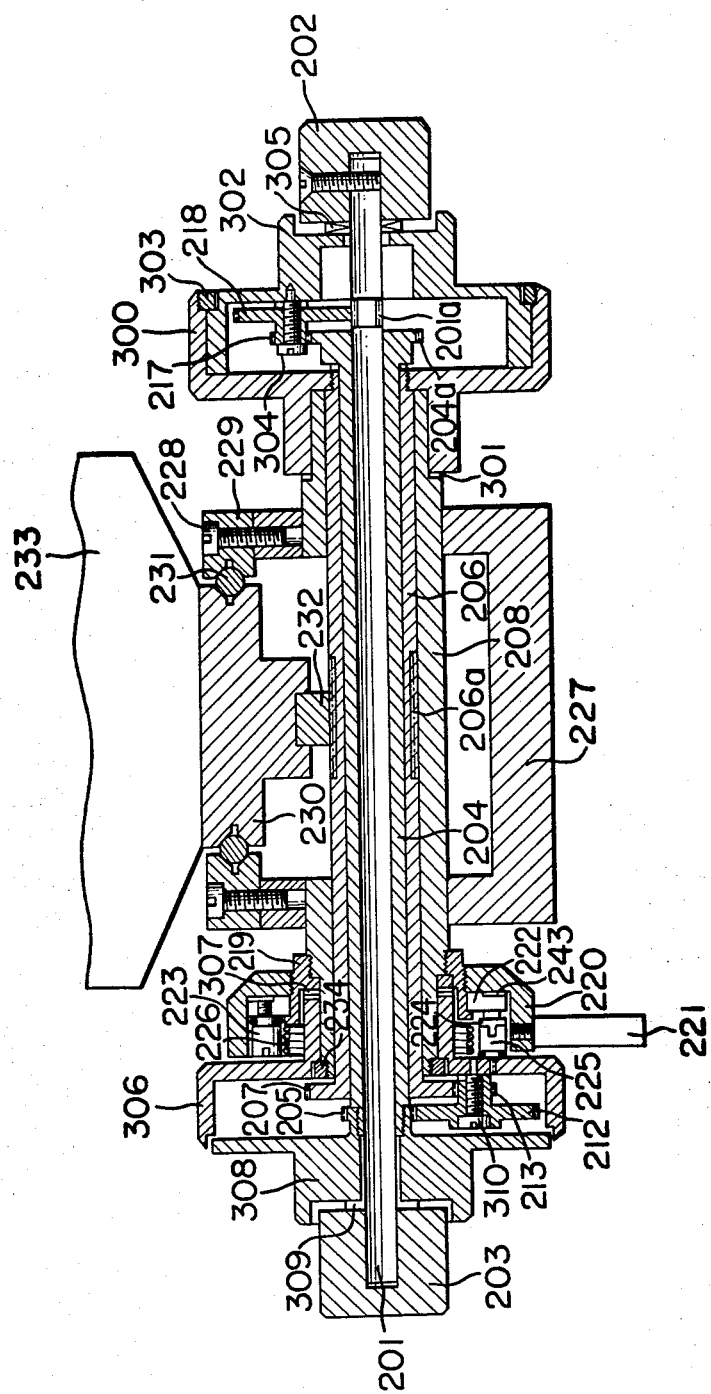

SINGLE-AXIS COARSE AND FINE ADJUSTMENT DEVICE PROVIDED WITH MEDIUM ADJUSTMENT

BACKGROUND OF THE INVENTION

1. Field of the Invention

This invention relates to a single-axis coarse and fine adjustment device in which coarse and fine adjustments can be accomplished by a single guide mechanism and which is additionally provided with novel drive means called a medium adjustment.

2. Description of the Prior Art

For use with microscopes, there are various types of coarse adjustment handle (in a single-axis coarse adjustment or coarse and fine adjustment device). One of them is such that the stroke of the stage for one complete rotation of the coarse adjustment handle is of the order of 3 to 6 mm. This type is suitable to effect the focusing of objective lenses having low magnifications ranging from 4x to 10x. On the other hand, however, such coarse adjustment handle is unsuitable in that it must be frequently rotated to lower the stage when interchange of the cover glass is desired or when the end of the objective lens is to be immersed in oil. Further, it is insensitive to the focusing of objective lenses having an extremely low magnification such as 1x. Such coarse adjustment system is most often found in the microscopes produced in Europe.

There are also coarse adjustment handles designed such that the stroke of the stage for one complete rotation of the coarse adjustment handle is of the order of 20 to 40 mm. This overcomes the disadvantages peculiar to the above-described system. In other words, it is suitable for interchange of the cover glass or for the oil-immersing operation. Nevertheless, because of the great stroke, it is unsuitable for the focusing of objective lenses having magnifications or 4x to 10x. In order to effect such focusing by fine adjustment, the fine adjustment handle must be many times rotated and this is cumbersome in use. Such coarse adjustment system is most often found in the microscopes produced in Japan.

SUMMARY OF THE INVENTION

It is an objective of the present invention to provide a single-axis coarse and fine adjustment device in which a medium adjustment mechanism is added to a single guide mechanism to solve the above-noted problems existing in the coarse adjustment.

The above and other objects and features of the present invention will become more fully apparent from the following detailed description of some embodiments of the invention taken in conjunction with the accompanying drawings.

BRIEF DESCRIPTION OF THE DRAWINGS

FIG. 9 is a longitudinal sectional view showing a fourth embodiment of the present invention.

DESCRIPTION OF THE PREFERRED EMBODIMENT

Figure 1:
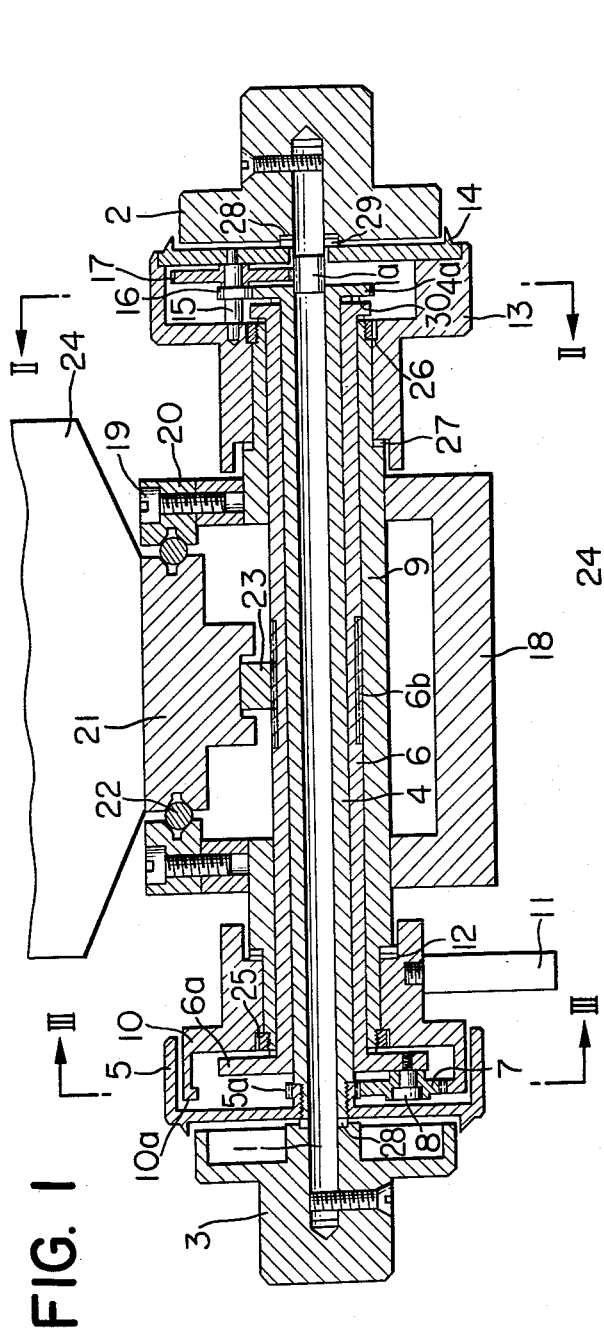
FIG. 1 is a longitudinal sectional view showing a first embodiment of the present invention.
Figure 2:
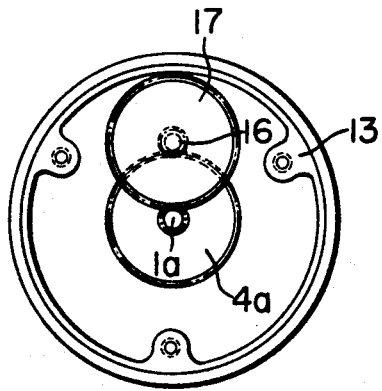
FIG. 2 is a view taken along line II—II in FIG. 1.
Figure 3:
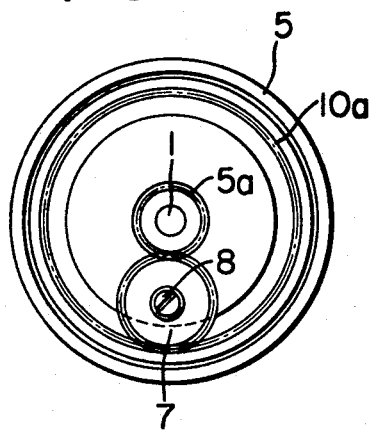
FIG. 3 is a view taken along line III—III in FIG. 1.

Referring to FIGS. 1 to 3, there is shown an embodiment of the present invention. Designated by 1 is a fine adjustment shaft having fine adjustment handles 2 and 3 securely mounted at the opposite ends thereof. A gear 1a is formed on the right end portion of the fine adjustment shaft 1, as viewed in FIG. 1. A connecting shaft 4 is rotatably fitted around the fine adjustment shaft 1 and has a threaded portion and a gear 4a formed on the left and right ends thereof, respectively. A medium adjustment handle 5 is screwed onto the left threaded portion. The medium adjustment handle 5 has a gear 5a integrally formed therewith. A pinion shaft 6 is rotatably fitted around the connecting shaft 4. A flanged portion 6a is formed on the left end of the pinion shaft 6 and a pinion 6b is formed on the middle portion of the pinion shaft. A planetary gear 7 is rotatably mounted to the flanged portion 6a by means of a fixing screw 8. The planetary gear 7 is in meshing engagement with the gear 5a formed on the left end of the medium adjustment handle 5. A stationary shaft 9 is integrally formed with a metallic pedestal 18 which will later be described, and supports the aforementioned shafts 1, 4 and 6. A coarse adjustment ring 10 is rotatably fitted on the stationary shaft 9 at the left end thereof. An internal gear 10a is formed internally of the coarse adjustment ring 10. The internal gear 10a is in meshing engagement with the planetary gear 7. A coarse adjustment lever 11 is secured to the coarse adjustment ring 10. Alternatively, the members 10 and 11 may be integrally formed into a large handle. Designated by 12 is a bevel spring which determines the rotational torque of the coarse adjustment ring 10. On the other hand, a right-hand medium adjustment handle 13 is rotatably fitted on the right end of the stationary shaft 9. A case lid 14 is secured to the medium adjustment handle 13. A shaft 15 is secured to the case lid 14 and to the medium adjustment handle 13. The shaft 15 has a gear rotatably mounted thereon. This gear is a two-step gear comprising a gear 16 and a gear 17 having a greater number of teeth than that of the gear 16, these two gears being integrally formed with each other. The gear 16 is in meshing engagement with the gear 4a formed on the connecting shaft 4, and the gear 17 is in meshing engagement with the gear 1a formed on the fine adjustment shaft 1. A metallic pedestal 18 is integrally formed with the main body of a microscope. The aforementioned stationary shaft 9 is integrally formed with the metallic pedestal 18. A stationary race 20 is also secured to the metallic pedestal by means of set screws 19. The stationary race 20 is formed with a V-shaped groove. A movable race 21 is also formed with a V-shaped groove, and movable by means of balls inserted between the V-shaped grooves of the movable race 21 and the V-shaped groove of the stationary race 19. The movable race 21 is formed with a rack 23 which is in meshing engagement with the pinion 6b formed on the pinion shaft 6. A stage 24 is integrally formed with the movable race 21. The gravity of the stage and so on is transmitted by way of the rack 23 to bring about a rotational force in a direction to absorb any play between the gears. Designated by 25, 26 and 27, 28 are junk rings and washers, respectively.

With the above-described construction of the single-axis coarse and fine adjustment device provided with the medium adjustment according to the present invention, rotation of the right-hand fine adjustment handle 2 causes the gear 1a to deceleratively rotate the gear 17. Since the gears 16 and 17 are integrally formed with each other, the gear 16 rotates together with the gear 17 and deceleratively rotates the gear 4a. Thus, the connecting shaft 4 is rotated. The medium adjustment handle 5 is rotated with the connecting shaft 4. The planetary gear 7 which is in meshing engagement with the gear 5a is rotated. Since the coarse adjustment ring 10 has a suitable friction by the bevel spring 12, the planetary gear 7 is deceleratively rotated along the internal gear 10a. This causes rotation of the pinion shaft 6, which in turn causes the rack 23 in meshing engagement with the pinion 6b to move the stage 24. Rotation of the left-hand fine adjustment handle may likewise result in fine movement of the stage 24.

The medium adjustment will now be described. First, rotation of the right-hand medium adjustment handle 13 causes integral rotation of the gears 17 and 16 mounted on the shaft 15 secured to the wall of this handle and to the case lid 14. The rotation of the gear 16 causes revolution of the gear 4a, which in turn causes rotation of the connecting shaft 4 and rotation of the left-hand medium adjustment handle 5. It is apparent that the rotation of the right-hand medium adjustment handle is identical with the rotation of the right-hand medium adjustment handle 13. The rotation of the left-hand medium adjustment handle 5 causes rotation of the planetary gear 7 which is in meshing engagement with the gear 5a. Since the coarse adjustment ring 10 has a suitable friction by the bevel spring 12, the planetary gear 7 is deceleratively rotated along the internal gear 10a. This causes rotation of the pinion shaft 6, which in turn causes movement of the stage 24 which is in meshing engagement with the pinion 6b. Rotation of the left-hand medium adjustment handle 5 may likewise result in movement of the stage 24.

Coarse adjustment will now be described. When the coarse adjustment lever 11 is rotated against the friction imparted by the bevel spring 12, the planetary gear 7 in meshing engagement with the internal gear 10a formed in the coarse adjustment ring 10 is rotated therewith, so that the pinion shaft 6 is also rotated simultaneously therewith. The rotation of the pinion shaft 6 causes great movement of the stage 24 by the rack 23 which is in meshing engagement with the pinion 6b.

Description will now be made of the effect of the slack taking place when the fine adjustment handle is rotated. Because of the ball race used as the translation guide mechanism, the gravity of the stage 24 rotates the pinion 6a in one direction without causing any friction thereto. As the result, there is a force acting to rotate the planetary gear 7, gear 5a, connecting shaft 4, gear 4a, gear 16, gear 17 and fine adjustment shaft 1 in one direction. Since anti-rotation is imparted to the fine adjustment shaft 1 by the force of the spring washer 29, each gear is in meshing engagement while being urged in one direction. Thus, any slight rotation of the fine adjustment handle is exactly transmitted in the form of vertical movement of the stage. On the other hand, in order that the medium and the coarse adjustment handles may operate normally without slack or backlash, the magnitude of the friction torque of each handle should be determined as follows:

fine adjustment 2a < right-hand medium adjustment 27 < left-hand medium adjustment 30 < coarse adjustment 12. By so determining, the fine adjustment handles never rotate reversely even if coarse or medium adjustment is effected. If right-hand medium adjustment 27 > left-hand medium adjustment the rotational force transmitted via the connecting shaft 4 upon rotation of the left-hand medium adjustment will act to acceleratively rotate the gears 16 and 17 instead of revolving them, so that the fine adjustment will rapidly be reversed in direction. This might be prevented to some extent by the spring washer 29 of the fine adjustment shaft 1, but could never be prevented if the friction 27 of the right-hand medium adjustment handle is too great.

Figure 4:
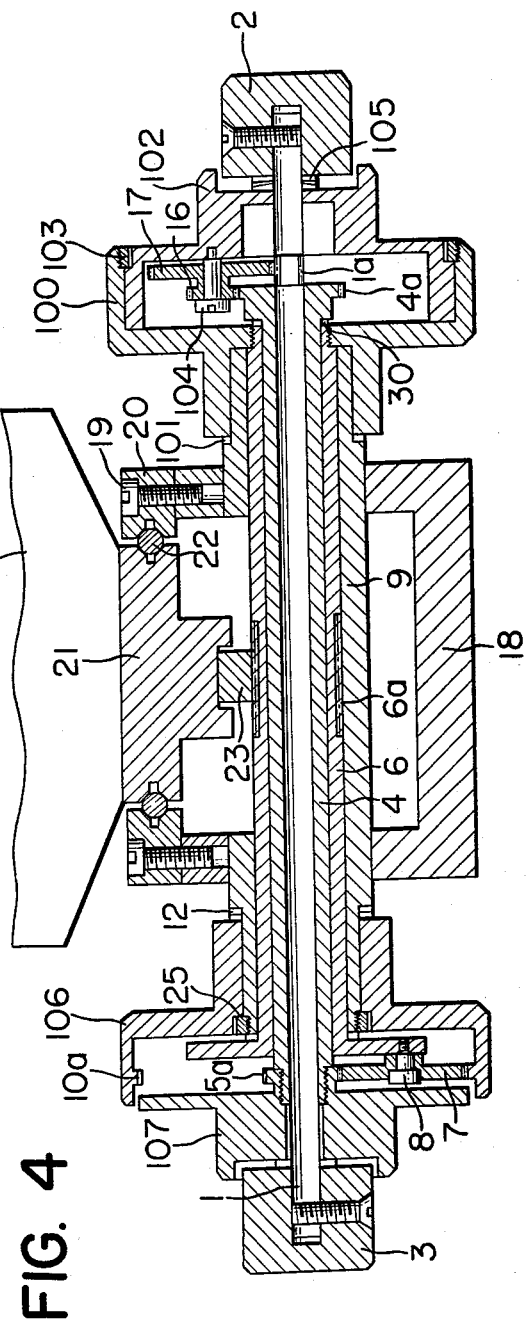
FIG. 4 is a longitudinal sectional view showing a second embodiment of the present invention.

FIG. 4 shows another embodiment of the present invention, in which the fine, the medium and the coarse adjustment handles are disposed symmetrically, respectively. Designated by 100 is a right-hand coarse adjustment handle secured onto the pinion shaft 6 and rotatably fitted to the stationary shaft 9 with a washer 101 interposed therebetween. Designated by 102 is a right-hand medium adjustment handle disposed in contact with the inner wall of the coarse adjustment handle 100 so as to provide a certain friction force (which corresponds to the friction 27 of the right-hand medium adjustment handle in the first embodiment) and rotatably mounted on the fine adjustment shaft 1. Designated by 103 is a junk ring. A shaft 104 is secured to the wall of the right-hand medium adjustment handle 102 by screws, and gears 16 and 17 integrally formed with each other are rotatably mounted on the shaft 104. Designated by 105 is a spring washer which determines the rotational torque of the right-hand fine adjustment handle 2. A left-hand coarse adjustment handle 106 is rotatably fitted on the stationary shaft 9 with a spring washer 12 interposed therebetween. A medium adjustment handle 107 is screwed onto the connecting shaft 4. The other reference numerals are similar in significance to those shown in the previous embodiment. First, when the right-hand coarse adjustment handle 100 is rotated, the rotational force is transmitted through the pinion shaft 6, the pinion 6a and the rack 23 to effect coarse adjustment. On the other hand, when the left-hand handle 106 is rotated, the planetary gear 7 is rotated therewith while, at the same time, the pinion shaft 6 is also rotated, thus effecting coarse adjustment. When the right-hand medium adjustment handle 102 is rotated, the gears 16 and 17 are rotated therewith so that the connecting shaft 4 is rotated by the gear 16 and the rotational force is transmitted through the connecting shaft 4, gear 5a, planetary gear 7, pinion shaft 6, pinion 6a and rack 23, thereby effecting medium adjustment. Rotation of the left-hand medium handle 107 may likewise result in medium adjustment, because this handle is integrally formed with the connecting shaft 4. When the right-hand fine adjustment handle 2 is rotated, the rotational force is transmitted through the gear 1a, gears 17, 16, gear 4a, connecting shaft 4, gear 5a, planetary gear 7, pinion shaft 6, pinion 6a and rack 23, thereby effecting fine adjustment. Rotation of the left-hand fine adjustment handle 3 may likewise result in fine adjustment.

Figure 6:
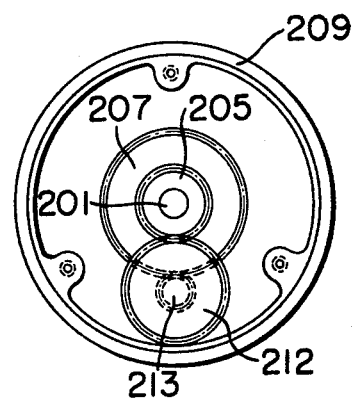
FIG. 6 is a view taken along line VI—VI in FIG. 5.
Figure 8:
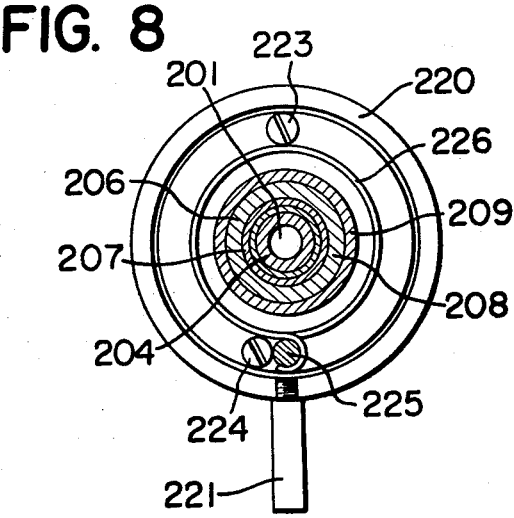
FIG. 8 is a view taken along line VIII—VIII in FIG. 5.
Figure 5:
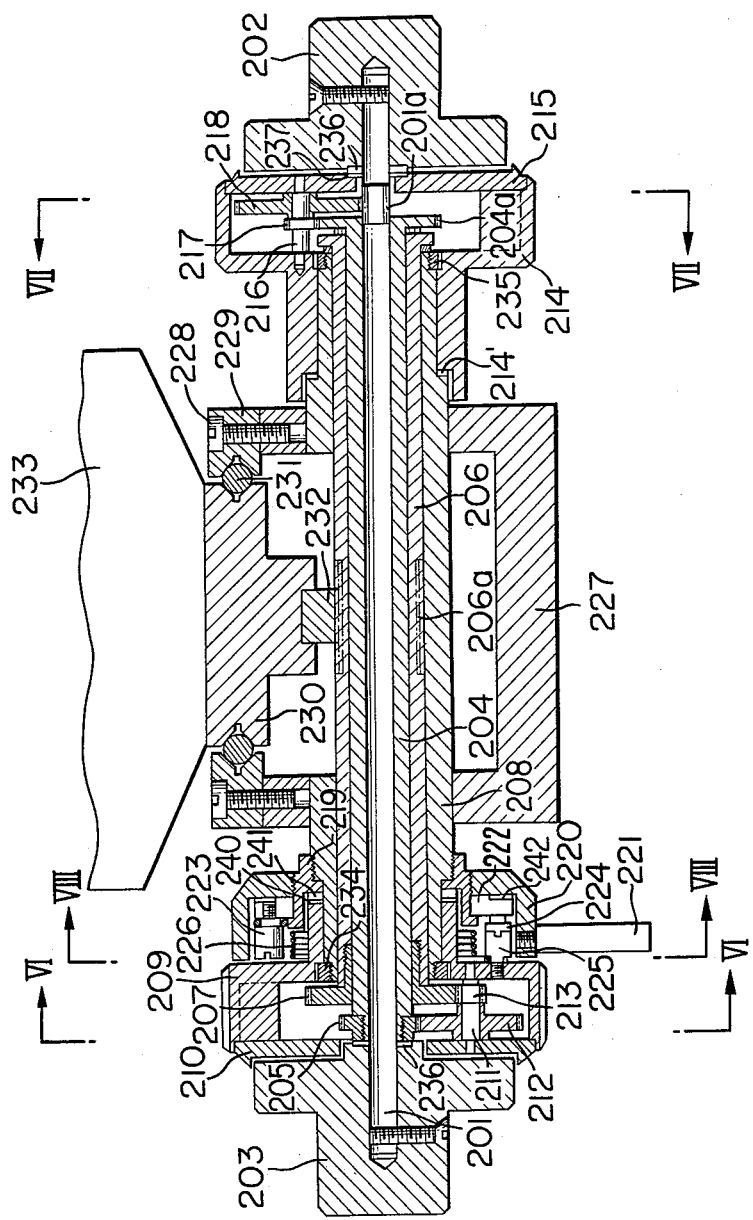
FIG. 5 is a longitudinal sectional view showing a third embodiment of the present invention.

Reference will now be had to FIGS. 5 and 8 to describe a third embodiment of the present invention in detail. Designated by 201 is a fine adjustment shaft having fine adjustment handles 202 and 203 secured to the opposite ends thereof. A gear 201a is formed on the right end portion of the fine adjustment shaft 201. A connecting shaft 204 is rotatably fitted around the fine adjustment shaft 201 and has a threaded portion and a gear 204a formed on the left and right end portions thereof, respectively. A gear 205 is threadably coupled to the left threaded portion of the connecting shaft. A pinion shaft 206 is rotatably fitted around the connecting shaft 204 and has a pinion 206a formed substantially on the middle portion thereof. The pinion shaft 206 has its left end portion also formed as a screw, to which a gear 207 is threadably coupled. Designated by 208 is a stationary shaft integrally formed with a metallic pedestal 227 which will later be described, and rotatably supporting the above-described fine adjustment shaft 201, connecting shaft 204 and pinion shaft 206. A coarse adjustment handle 209 is rotatably mounted on the left end portion of the stationary shaft 208 with a washer 240 and a spring washer 241 interposed therebetween. A case lid 210 is secured to the coarse adjustment handle 209. A shaft 211 is secured to the case lid 210 and to a wall portion of the coarse adjustment handle 209. The shaft 211 rotatably supports thereon a gear 212 integrally formed therewith and a gear 213 having a smaller number of teeth than that of the gear 212. The gear 212 is in meshing engagement with the gear 205 threadably coupled to the connecting shaft 206 and the gear 213 is in meshing engagement with the gear 207 secured to the pinion shaft 206 (see FIG. 6).

Figure 7:
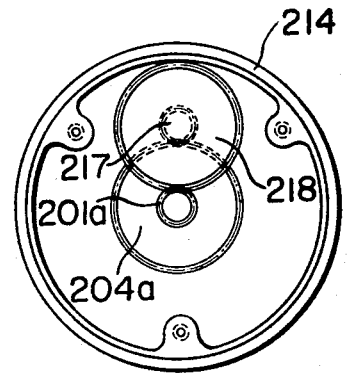
FIG. 7 is a view taken along line VII—VII in FIG. 5.

A medium adjustment handle 214 is rotatably mounted on the right end portion of the stationary shaft 208 and with a friction imparted thereto. A case lid 215 is secured to the medium adjustment handle 214. A shaft 216 is secured to the case lid 215 and to a wall portion of the medium adjustment handle 214. The shaft 216 rotatably supports thereon a gear 217 integrally formed therewith and a gear 218 having a greater number to teeth than that of the gear 217. The gear 217 is in meshing engagement with the gear 204a formed on the connecting shaft 204 and the gear 218 is in meshing engagement with the gear 201a formed on the fine adjustment shaft 201 (see FIG. 7). Designated by 219 is a stationary shaft auxiliary metal threadably coupled to the stationary shaft 208. A refocusing ring 220 is rotatably screwed onto the threaded portion of the stationary shaft auxiliary metal 219. A reinforcing lever 221 is secured to the refocusing ring 220. A rotatable ring 222 is rotatably fitted between the stationary shaft auxiliary metal 219 and the refocusing ring 220. Two pins 223 and 224 are studded in the rotatable ring 222, as shown in FIG. 8. A pin 225 is studded in the outer wall of the coarse adjustment handle 209. A helical spring 226 is wound on the coarse adjustment handle 209 and has the opposite ends thereof secured to the pins 223 and 225, respectively. The rotatable ring 222 is normally biased clockwise by the helical spring 226, as the result of which the pins 224 and 225 are normally engaged with each other. These members described above constitute a refocusing device.

Designated by 227 is a metallic pedestal integrally formed with the main body of a microscope. The aforementioned stationary shaft 208 is integrally formed with the metallic pedestal 227. A stationary race 229 is secured to the metallic pedestal by set screws 228. The stationary race 229 is formed with a V-shaped groove. A movable race 230 is also formed with a V-shaped groove, and movable by means of balls 231 inserted between the V-shaped groove of the movable race and the V-shaped groove formed in the stationary race 229. A rack 232 is secured to the movable race 230 and in meshing engagement with the pinion 206a formed on the pinion shaft 206. A stage 233 is integrally formed with the movable race 230. Designated by 234 and 235 are junk rings for the coarse adjustment handle 209 and the medium adjustment handle 214, respectively. Designated by 236 and 242 are washers, and 237 is a spring washer which determines the rotational torque of the fine adjustment handle.

With the above-described construction of the singleaxis fine adjustment device provided with the medium adjustment according to the present invention, rotation of the right-hand fine adjustment handle 202 causes the gear 201a to deceleratively rotate the gear 218. Since the gears 218 and 217 are integrally formed with each other, the gear 204a is deceleratively rotated by the gear 217. Thus, the connecting shaft 204 is rotated. Since the gear 205 is secured to the connecting shaft 212, the gear 212 is deceleratively rotated. Since the gears 212 and 213 are integrally formed with each other, the gear 207 is rotated by the gear 213. Thus, the pinion shaft 206 is rotated so that the rack 232 meshing with the pinion 206a causes fine movement of the stage 233. Rotation of the left-hand fine adjustment handle 203 may likewise result in fine movement of the stage 233. Medium adjustment will now be discussed. Rotation of the medium adjustment handle 214 causes integral rotation of the gears 217 and 218 which are supported on the shaft 216 secured to the medium adjustment handle, thereby causing revolution of the gear 204a. Thus, the connecting shaft 204 is rotated. Since the gear 205 is secured to the connecting shaft 204, the gear 212 is deceleratively rotated. Since the gears 212 and 213 are integrally formed with each other, the gear 207 is deceleratively rotated by the gear 213. Thus, the pinion shaft 206 is rotated so that the stage 233 is moved by the rack 232 meshing with the pinion 206a. Coarse adjustment will now be explained. Rotation of the coarse adjustment handle 209 causes integral rotation of the gears 212 and 213 which are supported on the shaft 211 secured to the coarse adjustment handle 209. By the gear 213, the gear 207 is revolved and the pinion shaft 206 is rotated simultaneously therewith. The stage 233 is caused to effect great movement by the rack 232 meshing with the pinion 206a. Since one end of the helical spring 226 is secured to the pin 225 secured to a wall portion of the coarse adjustment handle 209, the pin 224 secured to the rotatable ring 222 is brought into contact with the pin 225, so that the rotatable ring 222 is rotated with the coarse adjustment handle 209. At a stage where the focusing operation by the coarse adjustment handle 209 is terminated, the refocusing lever 221 is pivoted. Upon this pivotal movement, the rotatable ring 222 is urged and fixed by the stationary shaft auxiliary metal 219 and the refocusing lever 221. In such a state, even if the coarse adjustment handle 209 is rotated for interchange of the cover glass, the refocusing operation may be readily accomplished.

Description will now be made of the effect of the slack taking place when the fine adjustment handles are rotated. Because of the ball race used as the translation guide mechanism, the gravity of the stage 233 rotates the pinion 206a in one direction without causing any friction thereto. As the result, there is a force acting to rotate the gear 207, gears 212, 213, gear 205, connecting shaft 204, gear 204a, planetary gears 216, 217, and fine adjustment shaft 201 successively in one direction. Since anti-rotation is imparted to the fine adjustment shaft 201 by the force of the spring washer 237, each gear is in meshing engagement while being urged in one direction and without any backlash. Thus, any slight rotation of the fine adjustment handle is exactly transmitted in the form of vertical movement of the stage. On the other hand, in order that the medium and the coarse adjustment handles may operate normally without slack backlash, the magnitude of the friction torque of each handle should be determined as follows:

fine adjustment 236, 237 < medium adjustment 214′ < coarse adjustment 240, 241

By so determining, the fine adjustment handles never rotate reversely even if coarse or medium adjustment is effected. However, if medium adjustment is greater than coarse adjustment, the medium adjustment handles will be approximately stationary and therefore, upon rotation of the coarse adjustment handle, the planetary gears 217, 218 and gear 204a will not revolve but acceleratively rotate, so that the fine adjustment handle will rapidly be reversed in direction. This might be prevented to some extent by the spring washer 237 of the fine adjustment shaft 201, but could never be prevented if the friction of the right-hand medium adjustment handle is too great.

FIG. 9 shows a fourth embodiment of the present invention, in which the fine, the medium and the coarse adjustment handles are disposed symmetrically, respectively. Designated by 300 is a right-hand coarse adjustment handle threadably secured onto the pinion shaft 206 and rotatably fitted to the stationary shaft 208 with a washer 301 interposed therebetween. Designated by 302 is a right-hand medium adjustment handle disposed in contact with the inner wall of the coarse adjustment handle 300 so as to provide a certain friction force (which corresponds to the friction 214′ of the right-hand medium adjustment handle in the third embodiment) and rotatably mounted on the fine adjustment shaft 201. Designated by 303 is a junk ring. A shaft 304 is journalled to the wall of the right-hand medium adjustment handle 302, and gears 217 and 218 integrally formed with each other are rotatably mounted on the shaft 304. Designated by 305 is a spring washer which determines the rotational torque of the right-hand fine adjustment handle. A left-hand coarse adjustment handle 306 is rotatably fitted on the stationary shaft 208 with a spring washer 307 interposed therebetween. A medium adjustment handle 308 is screwed onto the connecting shaft 204. Designated by 309 is a washer. A shaft 310 is secured to a wall portion of the left-hand coarse adjustment handle 306 by screws and rotatably supports thereon gears 212 and 213 integrally formed with each other. The other reference numerals are similar in significance to those shown in the third embodiment.

First, when the right-hand coarse adjustment handle 300 is rotated, the rotational force is transmitted through the pinion shaft 206, the pinion 206a and the rack 232 to effect coarse adjustment. On the other hand, when the left-hand coarse adjustment handle 306 is rotated, the gears 212, 213 are rotated therewith while, at the same time, the pinion 206 is also rotated, thus effecting coarse adjustment. When the right-hand medium 302 is rotated, the gears 217 and 218 are rotated therewith so that the rotational force is transmitted through the connecting shaft 204, gear 205, gears 212, 213, gear 207, pinion shaft 206 pinion 206a and rack 232, thereby effecting medium adjustment. Rotation of the left-hand medium handle 308 may likewise result in medium adjustment, because this handle is integrally formed with the connecting shaft 204. When the right-hand fine adjustment handle 202 is rotated, the rotational force is transmitted through the gear 201a, gears 218, 217, gear 204a, connecting shaft 204, gear 205, gears 212, 213, gear 207, pinion shaft 206, pinion 206a and rack 232, thereby effecting fine adjustment. Rotation of the left-hand fine adjustment handle 203 may likewise result in fine adjustment.

According to the present invention, as has hitherto been described, the three drives, namely, fine, medium and coarse adjustments may be selectively used and this enables the following usages:

Fine adjustment: chiefly for the focusing of oil-immersed objective lenses having magnifications from 20x to 100x Medium adjustment: chiefly for the focusing of objective lenses having magnifications from 4x to 20x Coarse adjustment: chiefly for the focusing of objective lenses having magnifications from 1x to 4x, or in cases where the stage must be greatly lowered for the interchange of accesories or cover glass or for the oil-immersing operation Further, the three drives may be provided by a single guide mechanism of relatively simple construction, which means a lower cost. Furthermore, accurate drive may be accomplished even by rotation of the coarse and medium adjustment handles. Also, a great stroke of coarse adjustment by the coarse adjustment handle may be secured and this means a great ease of use when the refocusing device is installed. In addition, unlike the conventional system, the provision of the medium adjustment may make the fine adjustment finer and finer to thereby enhance the sensitivity without the need to be nervous about the gap of the reduction ratio between fine adjustment and coarse adjustment. Moreover, the strokes of fine adjustment and medium adjustment may be made to extend over a wide range equal to the stroke of coarse adjustment (about 20 to about 40 mm).

I claim:

1. A single-axis coarse and fine adjustment device for driving a carriage, comprising:

stationary support means;

a pinion shaft rotatably supported by the support means and having a pinion meshing with a rack provided on the carriage;

a connecting shaft rotatably supported within the pinion shaft and having a first toothed portion and a second toothed portion;

first decelerating gear means meshing with the first toothed portion to decelerate the rotation of the connecting shaft and transmit it to the pinion shaft;

a fine adjustment shaft rotatably supported within the connecting shaft and having a toothed portion;

a fine adjustment operating member for rotating the fine adjustment shaft;

second decelerating gear means meshing with the second toothed portion of the connecting shaft and the toothed portion of the fine adjustment shaft to decelerate the rotation of the fine adjustment shaft and transmit it to the connecting shaft;

a medium adjustment operating member rotatably supporting the second decelerating gear means and rotatably supported by the support means so as to impart rotation of equal ratio to the connecting shaft through the second gear means; and a coarse adjustment operating member rotatably supported by the support means so as to impart rotation of equal ratio to the pinion shaft through the first decelerating gear means;

said fine adjustment operating member being disposed in proximity to said medium adjustment operating member with a predetermined friction imparted thereto, and the friction for fine adjustment, the friction for medium adjustment acting between said medium adjustment operating member and said support means and the friction for coarse adjustment acting between said coarse adjustment operating member and said support means satisfying the following relation in magnitude:

friction for fine adjustment < friction for medium adjustment < friction for coarse adjustment; and said coarse adjustment operating member having an internal gear, and said first decelerating gear means being a planetary gear rotatably supported on said pinion shaft and meshing with said first toothed portion of said connecting shaft and said internal gear.

2. A device according to claim 1, wherein said second decelerating gear means comprises a first gear meshing with the toothed portion of said fine adjustment shaft and having a greater number of teeth than that of said toothed portion, and a second gear integrally formed with said first gear and meshing with the second toothed portion of said connecting shaft, the number of teeth of said second gear being smaller than that of said second toothed portion of said connecting shaft.

3. A device according to claim 2, wherein said fine adjustment operating member is securely mounted at each end of said fine adjustment shaft.

4. A device according to claim 3, further comprising a second medium adjustment operating member integrally formed with said connecting shaft and operable to rotate said connecting shaft directly by its own rotation.

5. A device according to claim 4, wherein the friction acting on said second medium adjustment operating member and said three frictions are provided so as to satisfy the following relation in magnitude:

friction for fine adjustment < friction for medium adjustment < friction for second medium adjustment < friction for coarse adjustment.

6. A device according to claim 5, further comprising a second coarse adjustment operating member integrally formed with said pinion shaft and operable to rotate said pinion shaft directly by its own rotation.

* * * * *